United States Patent [19]

Chen et al.

[11] Patent Number: 5,663,816

[45] Date of Patent: Sep. 2, 1997

[54] LIQUID CRYSTAL DISPLAY DEVICE COMPRISING REFLECTIVE HOLOGRAPHIC

[75] Inventors: Alan G. Chen, Schaumburg; Kevin W. Jelley, LaGrange Park; George T. Vallaith, Buffalo Grove, all of Ill.

[73] Assignee: Motorola, Inc., Schaumburg, Ill.

[21] Appl. No.: 594,361

[22] Filed: Jan. 30, 1996

Related U.S. Application Data

[63] Continuation of Ser. No. 143,600, Nov. 1, 1993, abandoned.

[51] Int. Cl.$^6$ ............................. G03H 1/26; G02B 5/32
[52] U.S. Cl. ....................... 359/15; 359/22; 349/113
[58] Field of Search ........................... 359/13, 14, 15, 359/22, 24, 25, 70, 71; 349/113, 114

[56] References Cited

U.S. PATENT DOCUMENTS

| | | | |
|---|---|---|---|
| 3,675,990 | 7/1972 | Kogelnik et al. | 359/15 |
| 4,832,459 | 5/1989 | Harper et al. | 359/71 |
| 4,978,183 | 12/1990 | Vick | 359/15 |
| 4,984,872 | 1/1991 | Vick | 359/15 |
| 5,011,244 | 4/1991 | Smith et al. | 359/15 |
| 5,198,912 | 3/1993 | Ingwall et al. | 359/3 |
| 5,267,060 | 11/1993 | Colton | 359/22 |
| 5,418,631 | 5/1995 | Tedesco | 359/15 |
| 5,471,327 | 11/1995 | Tedesco et al. | 395/15 |

FOREIGN PATENT DOCUMENTS

| | | | |
|---|---|---|---|
| 57-54926 | 4/1982 | Japan | 359/71 |
| 2-33126 | 2/1990 | Japan | 359/15 |
| 2-210383 | 8/1990 | Japan | 359/15 |
| 4-355424 | 12/1992 | Japan | 359/15 |
| 6-51124 | 2/1994 | Japan | 359/15 |
| 2052779 | 1/1981 | United Kingdom | 359/71 |

OTHER PUBLICATIONS

Tedesco, J.M., et al., "5.3: Holographic Diffusers for LCD Backlights and Projection Screens", *SID 93 Digest*, (1993) pp. 29–32.

Magarinos, et al., *Optical Engineering*, "Holographic Mirrors," vol. 24, No. 5, Sep./Oct. 1985, pp. 769–780.

Ingwall et al., *SPIE*, "Hologram Recording With a New Polaroid Photopolymer System," vol. 523, (1985), pp. 306–312.

Ingwall et al., *SPIE*, "The Mechanism of Hologram Formation in DMP-128 Photopolymer," vol. 883, (1988), pp. 102–105.

Ingram et al., *SPIE*, "Hologram: Liquid Crystal Composites," vol. 1555, (1991), pp. 279–290.

*Primary Examiner*—Paul M. Dzierzynski
*Assistant Examiner*—John Juba, Jr.
*Attorney, Agent, or Firm*—Douglas D. Fekete

[57] ABSTRACT

A liquid crystal display device (30) that is illuminatable by diffuse ambient light comprises a liquid crystal panel (32) and a reflective holographic optical element (34). Diffuse ambient light illuminating the front side (36) of the liquid crystal panel and traversing the liquid crystal panel is received at a reflection site (66) and is redirected with a reflection pattern (68) to retraverse the liquid crystal panel to form a bright pixel for a display. By concentrating diffuse light within a preferential reflection pattern, the reflective holographic optical element provides enhanced brightness for viewing the display under ambient light conditions. In one aspect, the reflective holographic optical element is a transflector (158, 208) and is combined with an internal light source (170, 220) for illuminating the display using either reflected ambient light or backlighting.

13 Claims, 3 Drawing Sheets

LIQUID CRYSTAL DISPLAY DEVICE COMPRISING REFLECTIVE HOLOGRAPHIC

This is a continuation of application Ser. No. 08/143,600, filed Nov. 1, 1993 and now abandoned.

BACKGROUND OF THE INVENTION

This invention relates to a liquid crystal display device that is adapted for illumination by ambient light. More particularly, this invention relates to such liquid crystal display device that includes a reflective holographic optical element that redirects diffuse light through a liquid crystal panel in a preferential reflection pattern. In one aspect of this invention, the reflective holographic optical element is a transflector for alternately backlighting the liquid crystal display.

A typical liquid display device comprises a liquid crystal panel for forming a display that is viewed through a front side of the panel. The liquid crystal panel comprises a layer of liquid crystal material sandwiched between front and back transparent polymer or glass plates and between front and back polarizers having perpendicular axes of polarization. Transparent electrodes are affixed to the inner surfaces of the transparent plates to alter the light transmission properties of the liquid crystal material in the adjacent region of the panel. In this manner, the electrodes define pixels that create the display. As used herein, pixels refer to a region of the liquid crystal panel that forms a light or dark area of the display. A common display is formed of pixels that are dots arranged in a regular array. Another common type of display comprises pixels arranged in a "FIG. 8" and selectively switched to form alphanumerical characters.

In the absence of an applied electric field, polarized light is admitted through one polarizer and reoriented by the liquid crystal layer to pass through the opposite polarizer, thereby causing the panel to be transparent and creating a bright pixel for the display. However, an electrical potential applied between the electrodes alters the intermediate liquid crystal material to prevent light from passing through the panel, thereby creating an opaque region in the panel that appears as a dark pixel. Thus, by selectively applying electrical current to the electrodes, the pixels are individually switched between a transparent or bright state and an opaque or dark state.

While the liquid crystal panel creates a display by locally altering the light transmission properties of the pixels, the liquid crystal panel does not generate the light needed for viewing the display. There are two basic approaches for providing light for the display. One approach utilizes ambient light and comprises a reflector facing the back side of the liquid crystal panel. At a transparent region, ambient light is filtered by the front polarizer, traverses the panel, is reflected by the reflector, and retraverses the panel to create a bright pixel. Of course, at a region that is opaque, light does not traverse the panel, creating a dark pixel. In a second approach, the device comprises a light source for illuminating the back side of the liquid crystal panel, whereupon the light is screened by the back polarizer and traverses transparent regions of the liquid crystal panel to create bright pixels. Attempts have been made to combine these two approaches in a device by employing a transflector between the back side of the liquid crystal panel and a light source. The transflector reflects ambient light for operation under ambient light conditions and transmits light from the light source for operation in that mode. One problem with conventional transflectors is that the efficiency of reflection, that is, the ratio of reflected light to incident light, is necessarily reduced by the transmission properties of the transflector, and, similarly, the transmission efficiency is reduced by the reflection properties of the transflector, so that, for example, a transflector that is 50 percent 50 percent transmissive reflects only about 50 percent of the light, thereby reducing the proportion of viewable light in both modes.

Whereas in backlighting, a desired brightness is achieved by providing a light source of a predetermined intensity, ambient lighting is dependent upon the brightness of the surrounding light, which may originate from any directions and varies in intensity. To provide adequate brightness under such varying conditions, reflectors have been developed that produce a diffuse reflection. In contrast to a mirror that produces a highly directional reflection based upon the angle of incidence of the light, a diffuse reflector reflects light uniformly over a wide range of angles, so that the intensity of reflected light is relatively independent of the direction of the ambient light. However, such diffuse reflection necessarily reduces the intensity of light perceived by the viewer. Moreover, the apparent brightness of the display is further diminished by losses in double transmission through the panel, for example, by the polarizers. As a result, ambient illumination suffers from diminished apparent brightness perceived by the viewer. This is particularly noticeable in situations of low ambient light. Therefore, there is a need to increase the efficiency of reflected light that is available for viewing the display to enhance the apparent brightness as perceived by the viewer.

SUMMARY OF THE INVENTION

This invention contemplates a liquid crystal display device that is illuminatable by diffuse ambient light, such as light within a room that irradiates the device from varying directions and with varying intensity. The liquid crystal display device comprises a liquid crystal panel and a reflective holographic optical element. The liquid crystal panel includes a front side for viewing a display and a back side, and further comprises at least one region having a transparent state, such that diffuse ambient light illuminating the front side traverses the panel and emanates from the back side. The reflective holographic optical element is optically coupled to the panel back side and comprises one or more reflection sites that receive light emanating from the liquid crystal panel and redirect the light in a reflection pattern toward the panel. Thus, at a transparent region of the liquid crystal panel, diffuse ambient light illuminating the front side traverses the panel to the reflective holographic optical element and is redirected to retraverse the region, thereby creating a bright pixel.

In one aspect of this invention, the reflective holographic optical element redirects the light in a constricted reflection pattern about a preferential axis that constitutes a preferred viewing angle. The diffuse ambient light received at a reflection site at angles of incidence outside the reflection pattern is redirected within the pattern to increase the apparent brightness of the display.

In another aspect of this invention, the reflective holographic optical element is a transflector. The liquid crystal display device further includes a light source in an arrangement such that the reflective holographic optical element is interposed between the light source and the back side of the liquid crystal panel. Ambient light traversing the liquid crystal panel is redirected by the reflective holographic optical element to retraverse the liquid crystal panel to provide brightness for the display. Alternately, light from the light source is transmitted through the reflective holographic optical element to illuminate the back side of the liquid crystal panel and traverses the liquid crystal panel to provide supplemental brightness for the display.

BRIEF DESCRIPTION OF THE DRAWINGS

The present invention will be further illustrated with reference to the accompanying drawings wherein.

DETAILED DESCRIPTION OF PREFERRED EMBODIMENTS

Figure 1:
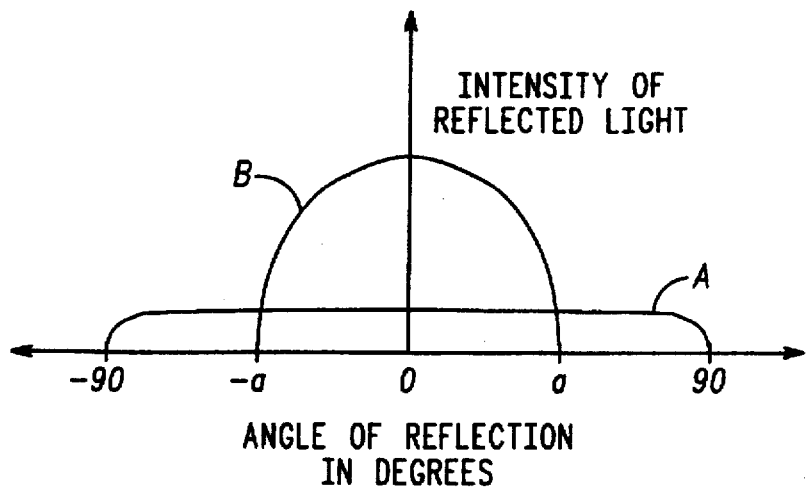
FIG. 1 is a graph showing reflected light intensity as a function of reflection angle for a diffuse reflector and for a reflective holographic optical element utilized in this invention.

It is helpful in understanding the present invention to recognize that a reflector is formed of a plurality of reflection sites such that an individual light ray is intercepted by the reflector at a particular site and is redirected as determined by the characteristics of the site. It is also helpful to recall that a light ray is reflected by a site of a mirror surface in a specific direction relative to an axis perpendicular to the mirror surface such that the angle of reflection is equal to the angle of incidence. A diffuse reflector of the type commonly employed within a liquid crystal display device scatters light over a range of angles such that the brightness is generally independent of the angle of incidence or the angle of reflection. FIG. 1 is a graph showing the intensity of reflected light emanating from a predetermined site of a reflector as a function of the reflection angle measured relative to an axis perpendicular to the site. Curve A depicts a preferred reflection pattern produced by a site of a diffuse reflector. In contrast, this invention employs a reflective holographic optical element that is adapted to be illuminated by diffuse ambient light and to redirect the light within a predetermined reflection pattern. A preferred reflection pattern is indicated by curve B and shows light confined within an angular space about the axis, such that, within the pattern, the light exhibits increased intensity, resulting in enhanced brightness.

Figure 2:
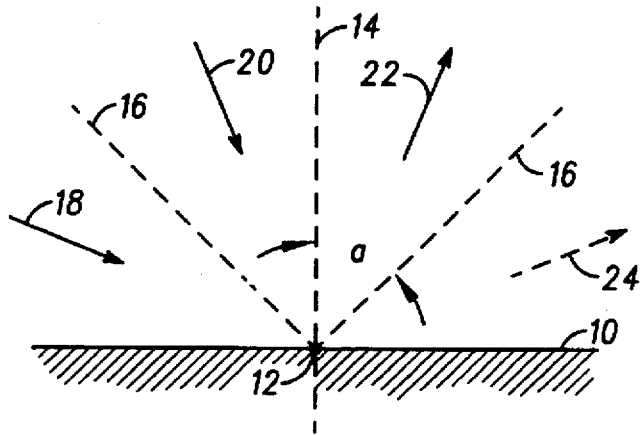
FIG. 2 is a diagram showing schematically a reflection pattern in accordance with a preferred embodiment of this invention.

Referring to FIG. 2, a preferred reflective holographic optical element 10 for use in this invention, also referred to herein as a holographic reflector, is formed of a continuum of reflection sites, of which site 12 is representative. In a preferred embodiment, the reflective element is a volume holographic optical element composed of a photographic film having regions of differing indices of refraction that cooperate, in a manner similar to a diffraction grating, to redirect light in an interference pattern, which is referred to as the reflection pattern. As used herein, reflection site refers to a region of the reflector from which the interference pattern appears to originate. Preferably, element 10 is formed of sites having substantially uniform reflection properties. In this example, the reflection pattern emanates through a conical space about an axis 14 perpendicular to element 10 at site 12 and bounded by boundary lines 16 that intersect site 12 at an angle a to axis 14. Angle a is preferably 60 degrees or less and is effective to concentrate diffuse light for dramatically increased brightness within the pattern.

It is a significant feature of this invention that reflective holographic element 10 is optically coupled to a liquid crystal panel to receive polarized light derived from diffuse ambient light, and to enhance viewing of a display along a preferred viewing angle corresponding to axis 14 in FIG. 2. As used herein, diffuse ambient lighting refers to lighting such as found in a well-lit room and in which light tends to irradiate a site from multiple directions and with varying intensity. When reflective holographic element 10 is exposed to diffuse ambient light, light rays irradiating site 12 may include rays indicated by arrow 18, outside the reflection pattern, and rays indicated by arrow 20, within the reflection pattern. In accordance with the preferred embodiment, these rays are redirected within the reflection pattern, for example, in the direction indicated by arrow 22. In contrast to a diffuse reflector that would also reflect light in the direction of arrow 24 outside the desired reflection pattern, the light emanating from site 12 is essentially confined within the reflection pattern. As a result, light outside the reflection pattern, such as along arrow 18, is redirected by the holographic reflector within the reflection pattern, thereby concentrating the light within the reflection pattern. This results in a gain in the intensity of light available for viewing within the reflection pattern, as indicated by curve B in FIG. 1. This in turn enhances the apparent brightness of the display perceived by the viewer.

In this example, the several reflection sites of reflective holographic element 10 produce reflection patterns about axes perpendicular to the element, which axis corresponds to a preferred viewing angle for the display. Also, in this example, the reflection pattern is circular about the axis. However, this invention may suitably employ an element that produces a reflection pattern in which light is preferentially redirected along an axis that is not perpendicular to the element, for example, for optimum viewing when the display device is tilted relative to the viewer. Furthermore, the axes of the reflective patterns from different sites may be nonparallel. Moreover, the characteristics of the interference pattern may be suitably modified to produce a reflection pattern that is non-circular. For example, the holographic reflector may produce a reflection pattern that is symmetrical about a preferred viewing axis, but has an elliptical cross-section to increase the range of viewing angles horizontally and narrow the viewing range vertically.

Figure 3:
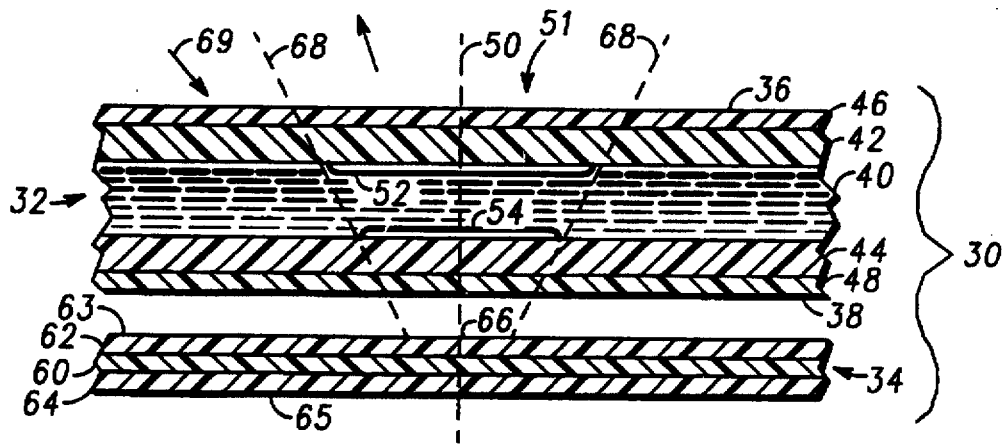
FIG. 3 is a cross sectional view of a liquid crystal display device comprising a reflective holographic element in accordance with a first embodiment of this invention.

Referring to FIG. 3, in a first preferred embodiment of this invention, a liquid crystal display device 30 comprises a liquid crystal panel 32 and a reflective holographic optical element 34.

Liquid crystal panel 32 is of the type that is readily commercially available and is adapted to form a display that is viewed through a front side 36. Panel 32 features a planar, laminar structure and includes a back side 38 opposite front side 36. The panel comprises a layer 40 formed, for example, of a twisted nematic liquid crystal material, interposed between front and back transparent polymeric plates 42 and 44, respectively. Panel 32 further comprises a front polarizer 46 affixed to the outer surface of plate 42 and a back polarizer 48 affixed to the outer surface of back plate 44. Polarizers 46 and 48 have axes of polarization oriented in perpendicular directions.

Liquid crystal panel 32 has an axis 50 that is generally perpendicular to the several elements and includes a region, indicated generally at 51, about axis 50 in which the elements cooperate to define a pixel for the display, which pixel is switchable between a transparent state and an opaque state. By way of an example of a conventional liquid crystal panel, panel 32 comprises transparent electrodes 52 and 54 affixed to the inner surfaces of plates 42 and 44, respectively, adjacent to liquid crystal layer 40. Suitable electrodes are formed of a transparent indium tin oxide material. In the absence of an electrical potential applied to electrodes 52 and 54, diffuse ambient light illuminating the panel front side 36 is filtered by front polarizer 46 to admit polarized light to the panel. The polarized light is reoriented by the liquid crystal layer 40 to adjust the polarization parallel to the axis of polarization of the back polarizer 48. In this manner, region 51 is transparent to the polarized light. Alternately, the application of an electrical potential to electrodes 52 and 54 disrupts the liquid crystal layer 40 so that the polarized light is not reoriented to pass through back polarizer 48. In this mode, region 51 is opaque. For purposes of illustration, this embodiment employs simple electrodes disposed on opposite surfaces. However, the electrodes may be suitable patterned in any configuration to produce a display of desired design. In an alternate example, electrodes affixed to the front plate are arranged in rows, and electrodes on the back plate are arranged in columns, whereupon pixels are defined at intersections where a row crosses a column.

Reflector 34 is a volume holographic optical element comprising a layer 60 of photographic material interposed between front and back transparent plate 62 and 64. Reflector 34 comprises a reflective front surface 63 from which reflected light appears to emanate and a back surface 65. Front surface 63 is composed of a plurality of substantially uniform reflection sites, of which site 66 is representative. In this embodiment, light illuminating site 66 emanates in a conical reflection pattern indicated by lines 68. A suitable holographic optical element is commercially available from the Polaroid Corporation under the trade designation "Mirage Hologram" and includes a layer 60 composed of a photopolymer having the trade designation "DMP-128", which is exposed to laser light and developed to form regions of varying indices of refraction that are effective to redirect light in an interference pattern corresponding to a preferred reflection pattern for use in device 30.

Figure 4:
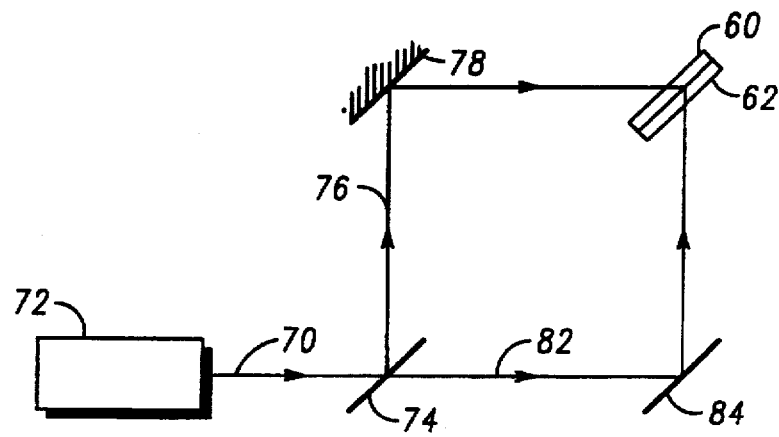
FIG. 4 is a schematic view showing an arrangement for exposing a photographic layer in forming a reflective holographic optical element for use in the liquid crystal display device in FIG. 3.

FIG. 4 depicts a typical arrangement for laser imaging photographic layer 60 to produce a suitable reflection pattern. During exposure and developing, layer 60 is carried on one plate 62, but is uncovered to permit subsequent treatment with developing solutions. A beam of light 70 emitted from a suitable laser device 72 is split by a beam splitter 74. A first portion 76 of light is reflected off a suitable pattern 78, such as a white reflector, and illuminates photographic layer 60. A second portion 82 is reflected by mirror 84 and simultaneously illuminates layer 60, thereby creating an interference pattern that is recorded in the photographic material. Thereafter, layer 60 is flood exposed to uniform white light, developed to permanently fix the interference pattern within the layer, and covered with the second plate 64.

Figure 5:
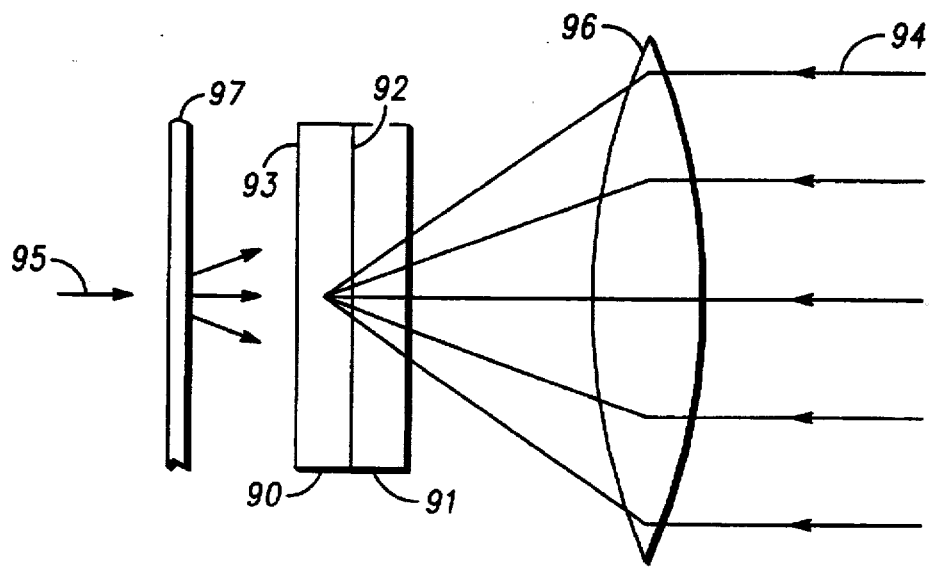
FIG. 5 is a schematic view showing an alternate arrangement for exposing a photographic material in forming a reflective holographic optical element for use in the liquid crystal display device in FIG. 3.

Alternately, a reflection pattern may be formed by exposing the photographic layer 90 as shown in FIG. 5. Layer 90 carried on one plate 91 and comprises opposite surfaces 92 and 93 that are simultaneously exposed to split laser beams 94 and 95. One surface 92, which corresponds to the surface intended to face the back side of the liquid crystal panel, is scanned by a laser beam focused by a lens 96 having a large aperture and short focal length that exposes each reflection site to light over a wide range of angles, similar to uniform, diffuse ambient light. The opposite surface 93 is exposed to the laser light through a transmissive optical diffuser 97 that produces an emission pattern corresponding to the desired reflection pattern. Following exposure to form the desired interference pattern within the photographic material, layer 90 is flood exposed, developed and covered with the second transparent plate to the complete reflective holographic optical element.

Reflective holographic optical element 34 is then combined with liquid crystal panel 32 to form the liquid crystal display device 30 in FIG. 1. In this arrangement, reflective surface 63 faces back side 38 of panel 32, and site 66 is axially aligned with region 51, so that holographic reflector 34 is optically coupled to liquid crystal panel 32 to receive light transmitted through the panel and to redirect the light toward the panel. Thus, in the absence of an applied electrical field between electrodes 52 and 54, diffuse ambient light illuminating surface 36 is filtered by front polarizer 42, reoriented by the liquid crystal layer 40 and passes through back polarizer 48. The polarized light emanating from panel back side 38 illuminates site 66 of holographic element 34 and is redirected by the holographic element within the reflection pattern indicated by lines 68, whereupon the light traverses the back polarizer 48, is reoriented by liquid crystal layer 40 and passes through front polarizer 46 to create a bright pixel for the display. Of course, when an electrical potential is applied between electrodes 52 and 54, the panel becomes opaque at region 51, so that ambient light does not traverse the panel 32 to illuminate site 66 and so that any light reflected by site 66, for example, light received through adjacent regions of the liquid crystal panel 32, does not traverse the panel, thereby creating a dark pixel for the display. Nevertheless, it is a significant feature of this invention that light traversing the panel to site 66 at angles outside the reflection pattern, such as indicated by arrows 69, is redirected within the reflection panel. Such light may include light that traverses the panel through regions about the desired pixel, as well as light that traverses the region at acute angles to the panel. In this regard, it is pointed out that the thicknesses of the several elements in FIG. 3 are exaggerated for illustration purposes. In any event, such diffuse light is redirected within the reflection pattern, resulting in a substantial increase in the apparent brightness of the pixel as viewed near axis 50, corresponding to the preferred viewing direction. This increased brightness is particularly dramatic in comparison to reflectors that produce a diffuse reflection.

While in FIG. 3, liquid crystal panel 32 and reflective holographic optical element 34 are spaced apart, the reflective element may be laminated onto panel back 38 to form an integral structure.

Figure 6:
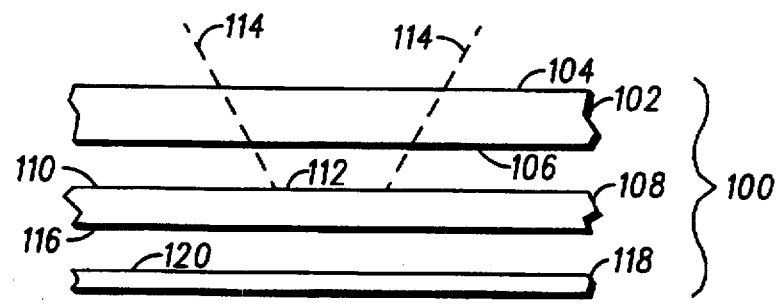
FIG. 6 is a cross sectional view of a liquid crystal display device comprising a reflective holographic element in accordance with an alternate embodiment of this invention.

Referring to FIG. 6, there is shown a liquid crystal display device 100 in accordance with an alternate embodiment of this invention. Device 100 comprises a liquid crystal panel 102 similar to liquid crystal panel 32 in FIG. 3, and having a front side 104 for viewing a display and a back side 106. In accordance with this invention, device 100 further comprises a reflective holographic optical element 108 having a front surface 110 facing back side 106 of liquid crystal panel 102. Reflective element 108 comprises a plurality of sites, of which reflection site 112 is representative. Reflection site 112 is adapted to receive diffuse lighting and to redirect the lighting within a reflection pattern indicated by lines 114. Reflective element includes a back surface 116 opposite front surface 110. In accordance with this embodiment, device 100 further includes a diffuse reflector 118 having a surface 120 facing surface 116 for receiving and reflecting light in a diffuse pattern.

In accordance with this embodiment, device 100 utilizes diffuse ambient light illuminating surface 104 in forming a display. The diffuse ambient light is filtered by the polarizers and intermediate liquid crystal material to transmit polarized light to illuminate site 112. At reflection site 112, the majority of diffuse light is redirected through panel 102 in the desired reflection pattern. Any light that is not reflected by reflector 108, such as light outside the effective spectral range of the reflector, is reflected by diffuse reflection element 118 toward panel 102 to further enhance the brightness of the display.

Figure 7:
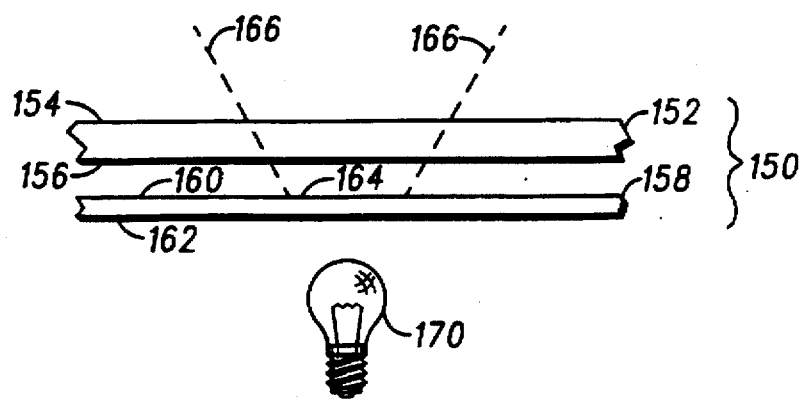
FIG. 7 is a cross sectional view of a liquid crystal display device comprising a reflective holographic element in accordance with still another embodiment of this invention.

Referring to FIG. 7, there is depicted liquid crystal display device 150 in accordance with a further embodiment of this invention. Device 150 comprises a liquid crystal panel 152 similar to panel 32 in FIG. 3 and comprising a front side 154 for viewing a display and a back side 156 opposite front side 154. Device 150 further comprises a reflective holographic optical element 158, which is a transflector in this embodiment. Transflector 158 comprises a front surface 160 facing panel back side 156 and a back surface 162. Transflector 158 comprises a plurality of reflection sites, of which reflection site 164 is representative. In a first method of operation, device 150 is adapted for forming a display using reflected ambient light. Accordingly, front side 154 is illuminated by diffuse ambient light, whereupon a polarized portion of such light traverses liquid crystal panel 154 and illuminates transflector 158, including at site 164. At site 164, the ambient light is redirected toward backside 156 in a reflection pattern indicated by lines 166. Alternately, device 150 is adapted to create a display utilizing back lighting, for example, under conditions of low ambient light. For this purpose, device 150 further comprises a light source 170 for illuminating the back side 162 of transflector 158. Light from source 170 transmits through transflector 158 to illuminate back side 156 and traverses liquid crystal panel 152 for creating a display. Thus the display may be formed utilizing either reflected ambient light or light from an internal source 170, or a combination of the two to achieve a desired brightness.

Figure 8:
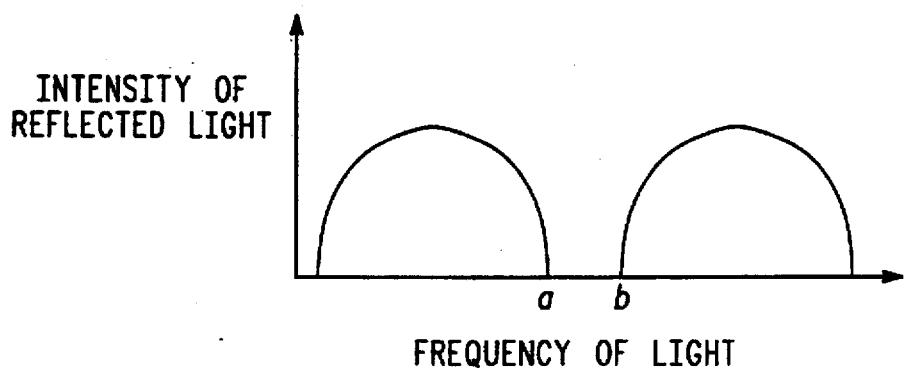
FIG. 8 is a graph showing reflected light intensity as a function of frequency for the reflective holographic element in FIG. 7.

Preferably, light source 170 is selected to emit light at a frequency that is not within the effective reflection spectral range of transflector 158. By way of a preferred example, referring to FIG. 8, transflector 158 may be formed by suitably exposing photographic material to visible light having frequencies less than a and greater than b so that the resulting holographic reflector comprises interference patterns effective to reflect light at frequencies less than a and greater than b, but not within the range between a and b. This range is referred to as a spectral passband or a spectral hole. By utilizing a light source 170 that emits light within the spectral hole, a high proportion of the light is transmitted through the transflector for illuminating the display, thereby increasing the efficiency of the backlighting.

Alternately, the holographic transflector may comprise multiple spectral holes and may be employed with one or more light sources emitting light having frequencies within the several holes, thereby permitting color optimization for the display.

Figure 9:
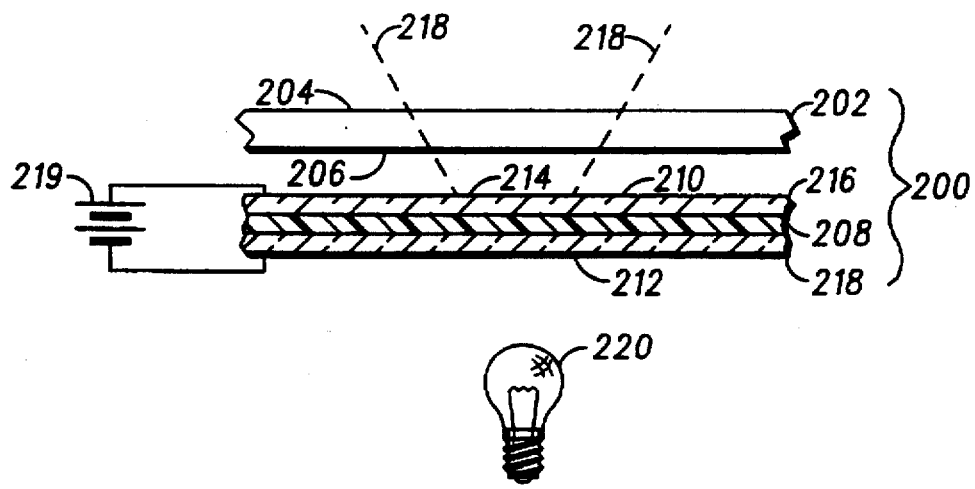
FIG. 9 is a cross sectional view of a liquid crystal display device comprising a reflective holographic element in accordance with still another embodiment of this invention.

Referring to FIG. 9, there is depicted a liquid crystal display device 200 in accordance with still another embodiment of this invention. Device 200 comprises a liquid crystal panel 202 similar to panel 32 in FIG. 3 and comprising a front side 204 for viewing a display and a back side 206. Device 200 further comprises a reflective holographic optical element 208, which is a transflector in this embodiment. Reflective element 208 comprises a front surface 210 facing panel back side 206 and a back surface 212. Panel 208 is formed of a plurality of reflection sites, of which reflection site 214 is representative.

In accordance with this embodiment, transflector 208 is electrically switchable between a first condition in which site 214 redirects diffuse light toward back side 206 in a reflection pattern indicated by lines 218 and a second condition wherein light is transmitted through the panel. A suitable holographic material comprises droplets of liquid crystal material dispersed in a polymeric matrix and is described in a paper by Richard T. Ingwall and Timothy Adams entitled, "Hologram: Liquid Crystal Composites," SPIE, Vol. 1555, p. 279–290, (1991), incorporated herein by reference. Surfaces 210 and 212 are coated with transparent electrically conductive layers 216 and 218, composed, for example, of indium tin oxide compound. In the absence of an electrical potential applied between layers 214 and 216, the liquid crystal droplets form an interference pattern that produces a holographic reflection pattern 218. However, an electrical potential 219 applied between layers 216 and 218 alters the liquid crystal material to erase the interference pattern, whereupon transflector 208 becomes transparent.

Thus, device 200 is adapted for forming a display using either a reflected ambient light or back lighting and comprises a light source 220 for illuminating back side 212 of transflector 208. In the first mode, without electrical potential 219 applied to layers 214 and 216, diffuse ambient light traversing through panel 202 to site 214 of transflector 208 is reflected in pattern 218 to produce a bright pixel for the display. Alternately, electrical potential 219 is applied to layers 214 and 216 to erase the holographic reflection pattern, and light source 220 is actuated. Light from source 220 is transmitted through transflector 208 and illuminates panel back side 206 to provide light for forming the display.

While this invention has been described in terms of certain embodiments thereof, it is not intended that it be limited to the above description, but rather only to the extent set forth in the claims that follow.

The embodiment of the invention in which an exclusive property is claimed are defined as follows.

What is claimed is:

1. A liquid crystal display device illuminatable by non-collimated diffuse ambient light that includes first light rays illuminating the liquid crystal display device in a first direction and second light rays illuminating the liquid crystal display device in a second direction distinct from the first direction, said liquid crystal display device comprising a liquid crystal panel for forming a display when viewed directly by a viewer, said liquid crystal panel having a front side for viewing the display and a back side opposite the front side, said liquid crystal panel comprising at least one region having a transparent state wherein light illuminating the front side traverses through the liquid crystal panel to the back side, and a reflective holographic optical element optically coupled to the panel back side for receiving light traversing said liquid crystal panel and for redirecting the first and second light rays in a reflection pattern toward the liquid crystal.

2. A liquid crystal display device according to claim 1 wherein the reflective holographic optical element comprises a plurality of reflection sites and wherein each said site has an axis and redirects the light in a reflection pattern symmetrical about the axis.

3. A liquid crystal display device according to claim 1 wherein the reflective holographic optical element is a volume holographic optical element.

4. A liquid crystal display device illuminatable by non-collimated diffuse ambient light that includes first light rays illuminating the liquid crystal display device in a first direction and second light rays illuminating the liquid crystal display device in a second angle distinct from the first direction, said liquid crystal display device comprising a liquid crystal panel for forming a display when viewed directly by a viewer, said liquid crystal panel having a front side for viewing the display and a back side opposite the front side and comprising at least one region that has a transparent state wherein polarized light derived from diffuse ambient light illuminating the front side traverses the liquid crystal panel, and a reflective holographic optical element optically coupled to the back side for receiving light traversing said liquid crystal panel and for redirecting the light toward the region, said reflective holographic optical element comprising a plurality of reflection sites, each said reflection site having an axis and redirecting said first and second light rays toward the liquid crystal panel in a reflection pattern having a cross-section symmetrical about the axis, whereby light redirected toward the region traverses the liquid crystal panel and creates a bright pixel for the display.

5. A liquid crystal display device in accordance with claim 4 wherein the reflection pattern is confined within an angle relative to the axis that is not greater than 60 degrees, such that light received at the reflection site at an angle greater than the angle is redirected within the reflection pattern.

6. A liquid crystal display device in accordance with claim 4 wherein the reflection pattern is conical about the axis.

7. A liquid crystal display device in accordance with claim 4 wherein the axis is generally perpendicular to the reflection site.

8. A liquid crystal display device in accordance with claim 4 wherein the reflective holographic optical element comprises a front surface facing the back side and a back surface opposite to the front face and wherein the liquid crystal display device further comprises an opaque reflective element adjacent to the back surface for reflecting light transmitted through the reflective holographic optical element toward the back side of the liquid crystal panel.

9. A liquid crystal display device illuminatable by diffuse ambient light and comprising a liquid crystal panel having a front side for viewing a display and a back side opposite the front side and comprising a plurality of regions, each region having a transparent state wherein light illuminating the front side traverses the panel to the back side, a transflector formed of a reflective holographic optical element having a front surface facing the panel back side that is illuminated by light traversing the liquid crystal panel and a back surface opposite the front surface, said reflective holographic optical element redirecting light illuminating the front surface in a reflection pattern toward the back side of the liquid crystal panel, and a light source for illuminating the back surface of the reflective holographic optical element.

10. A liquid crystal display device in accordance with claim 9 wherein the reflective holographic optical element is a volume holographic optical element formed of a photopolymer material having regions of varying indices of refraction and effective to redirect light in the reflection pattern.

11. A liquid crystal display device in accordance with claim 9 wherein the transflector comprises a spectral passband such that light emitted by the light source at frequencies within the spectral passband is transmitted through the transflector to illuminate the back side of the panel, and ambient light having frequencies outside the spectral passband that traverses the liquid crystal display is redirected by the transflector toward the liquid crystal panel.

12. A liquid crystal display device in accordance with claim 9 wherein the reflective holographic element is a transflector and is switchable between a reflective state wherein light illuminating the front surface is redirected toward the liquid crystal panel and a transparent state wherein light illuminating the back surface traverses the transflector to illuminate the liquid crystal panel.

13. A liquid crystal display device illuminatable by diffuse ambient light and comprising a liquid crystal panel having a front side for viewing a display and a back side opposite the front side and comprising a plurality of regions, each region having a transparent state wherein polarized light derived from diffuse ambient light illuminating the front side traverses the panel to the back side, and a reflective holographic optical element having a front surface facing the panel back side and a back surface opposite the front surface, said reflective holographic optical element comprising a plurality of reflection sites that receive light illuminating the front surface and redirect the light in a reflection pattern toward the back side of the liquid crystal panel, and an opaque reflective element facing the back surface to reflect light transmitted through the reflective holographic optical element.

* * * * *